United States Patent
Nammi et al.

(10) Patent No.: US 8,295,331 B2
(45) Date of Patent: Oct. 23, 2012

(54) MULTI-USER INTERFERENCE CANCELLATION IN A SINGLE-CARRIER RADIO RECEIVER

(75) Inventors: Sairamesh Nammi, Dallas, TX (US);
Narendra Tilwani, Addison, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 12/851,659

(22) Filed: Aug. 6, 2010

(65) Prior Publication Data

US 2012/0033715 A1 Feb. 9, 2012

(51) Int. Cl.
*H04B 7/10* (2006.01)
*H04B 1/707* (2011.01)

(52) U.S. Cl. ........................... 375/148; 375/347
(58) Field of Classification Search .................. 375/142, 375/143, 144, 148, 150, 152, 316, 343, 346; 455/63.1, 114.2, 278.1, 296
See application file for complete search history.

(56) References Cited

U.S. PATENT DOCUMENTS

| 2003/0048800 A1* | 3/2003 | Kilfoyle et al. ............... 370/441 |
| 2009/0147890 A1* | 6/2009 | Lee et al. ...................... 375/341 |

FOREIGN PATENT DOCUMENTS

EP 1 083 695 A1 3/2001

* cited by examiner

*Primary Examiner* — Khanh C Tran

(57) ABSTRACT

A method, apparatus, and radio receiver system for canceling multi-user interference in a single-carrier radio communication system. A front-end receiver such as a RAKE receiver receives a radio signal formatted in a sequence of frames, and outputs a plurality of user signals. An ordering unit determines for a current frame, an order in which to decode and remove the interference contributions of the plurality of user signals. The order may be based on a list of user signals sorted in the order of descending signal-to-interference-plus-noise ratio (SINR), modified by the success or failure of attempts to decode each user signal. A frame calculator determines a coherence time, which is used to calculate the number of subsequent frames in which the user signals are decoded in the determined order.

19 Claims, 4 Drawing Sheets

MULTI-USER INTERFERENCE CANCELLATION IN A SINGLE-CARRIER RADIO RECEIVER

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND

The present invention relates to radio communication systems. More particularly, and not by way of limitation, the present invention is directed to a method and apparatus in a radio receiver for canceling multi-user interference in a single-carrier radio communication system.

In the reverse link of single-carrier radio communication systems such as Code Division Multiple Access (CDMA) systems, all users share the same frequency and time resources. Each user is differentiated by a unique long Pseudo-random Noise (PN) sequence. Since the user codes are not perfectly orthogonal, each user causes interference to all the other in-cell users. Hence the performance (for example capacity) is interference limited. An interference-canceling scheme can enhance the performance of such systems.

There are a number of canceling schemes in the literature, which describe ways to remove the multi-user interference. Such schemes include, for example, Maximum Likelihood Detection (MLD) interference cancellation and the like. Unfortunately, the complexity of these schemes is very high. Furthermore, the complexity increases as the number of users increases, causing existing interference-cancellation schemes to become highly impractical.

SUMMARY

An embodiment of the present invention utilizes an ordering scheme to reduce the multi-user interference and the complexity of the system without compromising on the performance. In this embodiment, the inventive method comprises two stages. In a first stage, a prioritized ordering of the users is determined. In a second stage, this order is utilized in the interference-cancellation process to reduce the system complexity. In brief, the invention determines an ordered list of users for decoding and interference cancellation in a current frame, determines a number of subsequent frames to which the same ordered list can be applied, and decodes user signals and cancels interference contributions in the order of the ordered list for the determined number of frames. In this way, the ordered list does not have to be computed in each frame, thereby greatly minimizing the computational complexity of the interference cancellation process. Simulation studies have shown a doubling of system capacity when the present invention is implemented.

In one embodiment, the present invention is directed to a method in a radio receiver node for canceling multi-user interference in a single-carrier radio communication system in which a front-end receiver receives a radio signal formatted in a sequence of frames, and each frame includes a plurality of user signals, each user signal contributing to the multi-user interference. The method includes the steps of determining for a current frame, an order in which to decode and remove the interference contributions of the plurality of user signals; determining a number of subsequent frames in which the user signals are to be decoded in the determined order; and decoding and removing the interference contributions of the plurality of user signals in the determined order for the determined number of frames.

In another embodiment, the present invention is directed to an apparatus in a radio receiver node for canceling multi-user interference in a single-carrier radio communication system in which a front-end receiver receives a radio signal formatted in a sequence of frames, and each frame includes a plurality of user signals, each user signal contributing to the multi-user interference. The apparatus includes an ordered user list unit for determining for a current frame, an order in which to decode and remove the interference contributions of the plurality of user signals; a frame number calculator for determining a number of subsequent frames in which the user signals are to be decoded in the determined order; and a decoder for decoding and removing the interference contributions of the plurality of user signals in the determined order for the determined number of frames.

In another embodiment, the present invention is directed to a radio receiver system in a single-carrier radio communication network for receiving a radio signal comprising a plurality of user signals and for canceling multi-user interference between the plurality of received user signals, wherein the radio signal is formatted in a sequence of frames, and each frame includes the plurality of user signals. The receiver system includes a front-end receiver for detecting the radio signal and outputting the plurality of user signals; an ordered user list unit for determining for a current frame, an order in which to decode and remove the interference contributions of the plurality of user signals; a frame number calculator for determining a number of subsequent frames in which the received radio signals are to be decoded in the determined order; and a decoder for decoding and removing the interference contributions of the plurality of user signals in the determined order for the determined number of frames.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
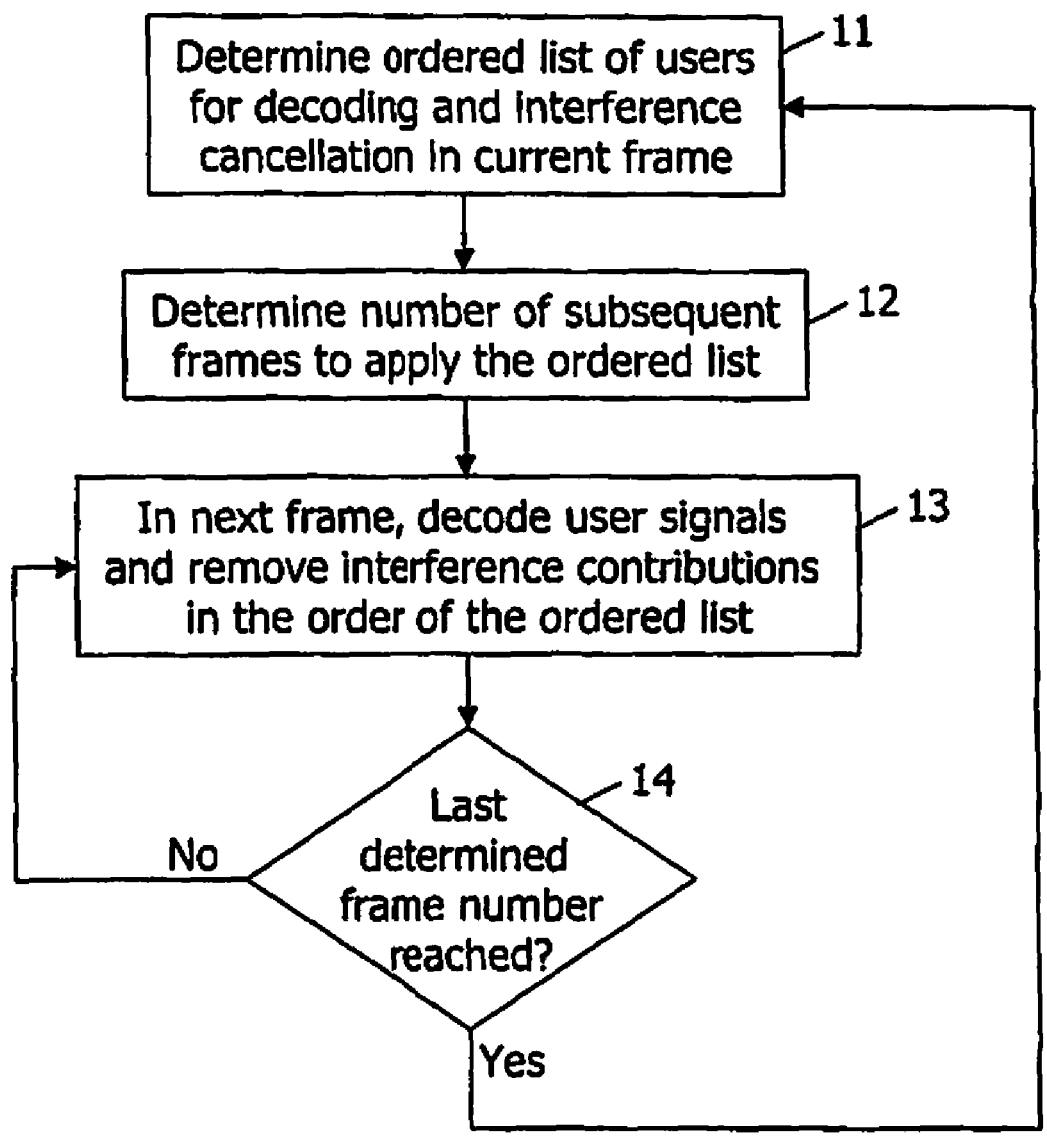
FIG. 1 is a flow chart illustrating the steps of an exemplary embodiment of the method of the present invention.

FIG. 1 is a flow chart illustrating the steps of an exemplary embodiment of the method of the present invention. For this example, it is assumed that N users are in the same sector and are transmitting at a given time instant t. A front-end receiver in a receiver node receives a radio signal and provides the multiple user signals to a back-end interference canceller, which performs the claimed method. The operation of the interference canceller may be controlled by a processor executing computer program instructions stored on a memory. Alternatively, the interference canceller may be implemented in hardware, firmware, or a combination of software, hardware, and firmware.

Figure 2:
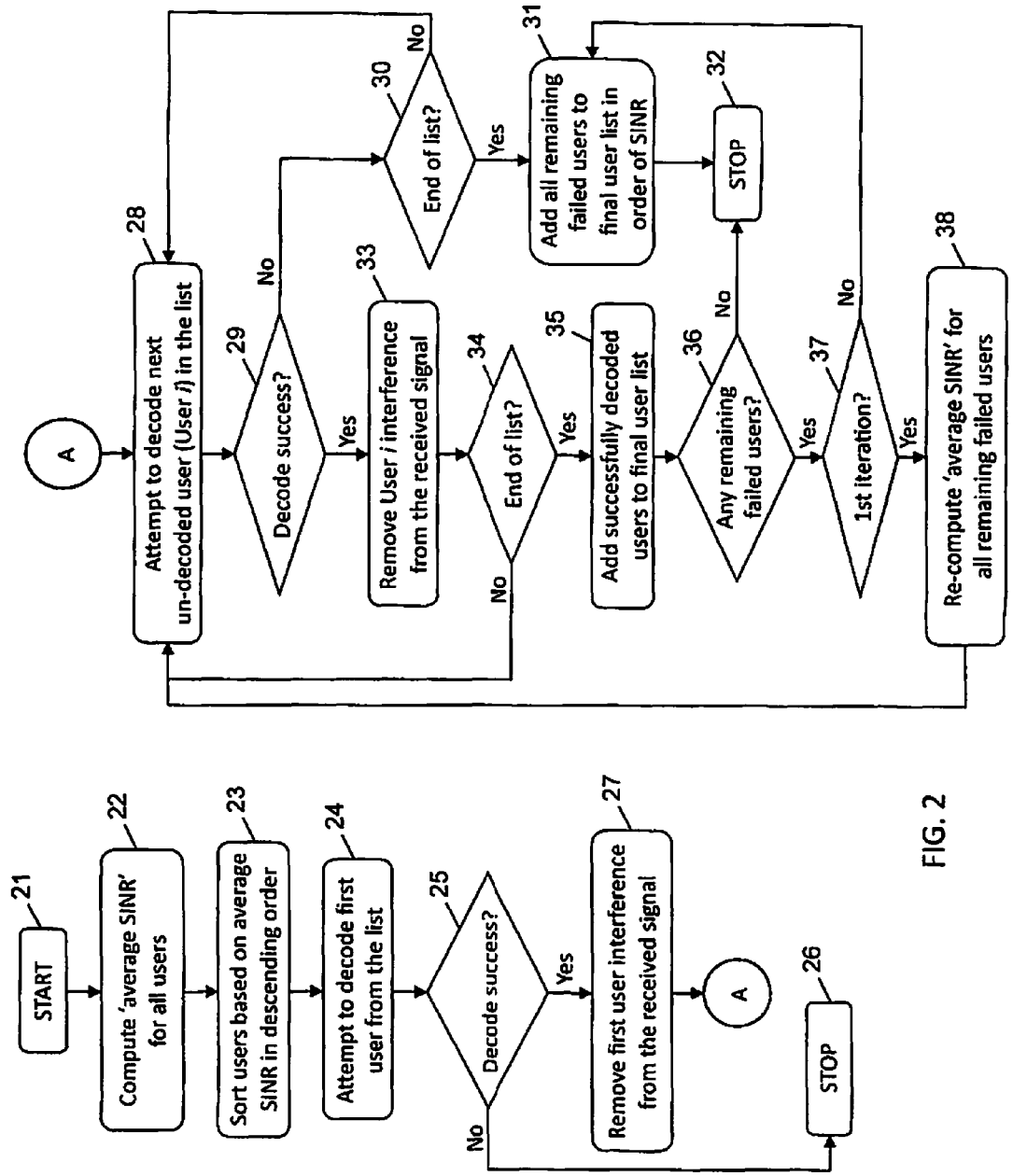
FIG. 2 is a flow chart illustrating the steps of an exemplary embodiment of a process of determining an ordered list of users.
Figure 3:
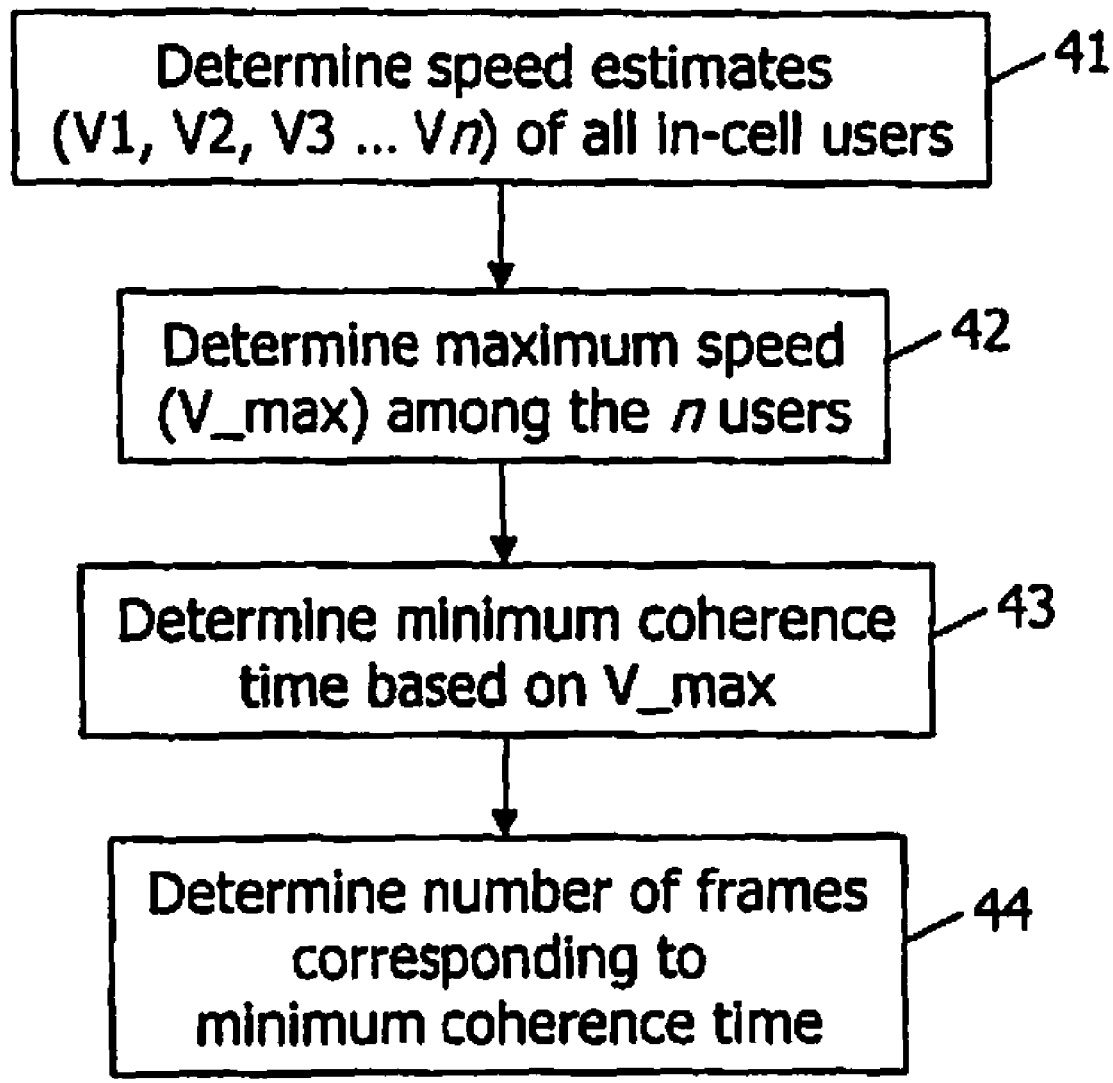
FIG. 3 is a flow chart illustrating the steps of an exemplary embodiment of a process of determining a number of subsequent frames in which the ordered list is utilized.

At step 11, the interference canceller determines an ordered list of users for decoding and interference cancellation in a current frame. An exemplary embodiment of this process is shown in FIG. 2. At step 12, the interference canceller determines a number of subsequent frames to which the same ordered list can be applied. An exemplary embodiment of this process is shown in FIG. 3. At step 13, the interference canceller decodes user signals and cancels interference contributions in the order of the ordered list in the next frame. At step 14, it is determined whether the last frame in the determined number of frames has been reached. If not, the process returns to step 13, where the interference canceller moves to the next frame and decodes user signals and cancels interference contributions in the order of the ordered list. When the last frame in the determined number of frames has been reached, the process returns to step 11, where the process is repeated with a new ordered list of users.

FIG. 2 is a flow chart illustrating the steps of an exemplary embodiment of a process of determining an ordered list of users. Briefly, the process starts from the user signal with the highest received signal quality and then cancels the interference contribution of all decoded signals in descending quality order. Signal quality may be determined in one embodiment, for example, as the average signal-to-interference-plus-noise ratio (SINR) at the output of the front-end receiver detector (for example, a RAKE receiver). In this case, the process starts from the user signal with the highest received average SINR and then cancels the interference contribution of all decoded signals in descending SINR order. The process then iteratively moves to those user signals that were not successfully decoded in the first iteration and repeats the process. Any remaining un-decoded user signals are added to the end of the user list in descending SINR order.

The process starts at step 21 and moves to step 22 where the interference canceller computes an average frame SINR for each of the user signals. At step 23, the user signals are sorted into a list based on their average SINR in descending order with the highest SINR first. At step 24, an attempt is made to decode the user signals starting with a first user signal at the top of the list. At step 25, it is determined whether the decoding attempt was successful. If not, then no other attempts to decode user signals need to be performed since it is known that the remaining user signals, with lower SINRs, will also fail. Therefore, the process stops at step 26, and the list of user signals in descending SINR order is used as the ordered list. However, if the decoding is successful, the process moves to step 27 where the first user signal is reconstructed and the interference contribution of the first user signal is removed from the received radio signal utilizing known techniques.

The process then moves to step 28 where an attempt is made to decode the next un-decoded user signal in the list (User i). At step 29, it is determined whether the decoding attempt was successful. If not, the process moves to step 30 where it is determined whether User i is at the end of the list. If so, the process moves to step 31 where all remaining failed user signals are added to the end of the final user list in the order of their SINR. The process then ends at step 32. However, if User i is not at the end of the list, the process returns to step 28 where an attempt is made to decode the next un-decoded user in the list. When User i is successfully decoded, the process moves to step 33 where the interference canceller removes User is interference contribution from the received signal utilizing known techniques.

At step 34, it is determined whether User i is at the end of the list. If User i is not at the end of the list, the process returns to step 28 where an attempt is made to decode the next un-decoded user in the list. With successful decodings, the process moves through the remaining users, decoding each signal and removing its interference contribution, until reaching the end of the list. The process then moves to step 35 where the successfully decoded user signals are added to the final user list. At step 36, it is determined whether there are any remaining user signals that failed the decoding attempt. If not, the process steps at step 32. However, if there are remaining failed user signals, the process moves to step 37 and determines if this is the first iteration of the ordering process. If it is the first iteration, the process moves to step 38 and re-computes the average frame SINR for each of the remaining failed user signals. The process then returns to step 28 and repeats the process in an attempt to decode the user signals that failed on the first iteration. Successfully decoded users are added to the final user list at step 35. Any remaining failed user signals after the second iteration are added at step 31 to the end of the final user list in the order of their SINR. The process then stops at step 32.

The following example illustrates the ordering process of FIG. 2. It is assumed there are seven user signals with SINRs in descending order from $SINR_1$ to $SINR_7$. Table 1 below shows the results of the decoding attempts in the first and second iterations.

TABLE 1

| SINR | Decoding Attempt 1 | Decoding Attempt 2 |
|---|---|---|
| $SINR_1$ | Pass | |
| $SINR_2$ | Pass | |
| $SINR_3$ | Pass | |
| $SINR_4$ | Fail | Pass |
| $SINR_5$ | Pass | |
| $SINR_6$ | Fail | Pass |
| $SINR_7$ | Fail | Fail |

Following the first iteration, the final user list is:
$\{SINR_1, SINR_2, SINR_3, SINR_5\}$.
After the second iteration, the final user list is:
$\{SINR_1, SINR_2, SINR_3, SINR_5, SINR_4, SINR_6, SINR_7\}$.
Note the change in order between $SINR_4$ and $SINR_5$. The change in order means that when decoding User-4, the interference of User-5 has to be cancelled, but not vice-versa.

In a further embodiment, additional decoding iterations may be made beyond the two iterations described above. In this embodiment, when there is more than one failed user signal, and at least one of the failed user signals has a higher SINR than a successfully decoded user signal, an additional decoding attempt may be made. A maximum number of iterations may be defined for stopping the process. Table 2 below shows an example of three iterations of decoding attempts in this embodiment.

| SINR | Decoding Attempt 1 | Decoding Attempt 2 | Decoding Attempt 3 |
|---|---|---|---|
| $SINR_1$ | Pass | | |
| $SINR_2$ | Fail | Pass | |
| $SINR_3$ | Fail | Fail | Pass |
| $SINR_4$ | Fail | Pass | |
| $SINR_5$ | Pass | | |
| $SINR_6$ | Fail | Pass | |
| $SINR_7$ | Fail | Fail | Fail |

Note that after the second decoding attempt, there were still two failed user signals ($SINR_3$ and $SINR_7$) and one of those user signals ($SINR_3$) has a higher SINR than $SINR_4$ or $SINR_6$, which were both successfully decoded. Therefore, a third decoding attempt is performed. At that point, only $SINR_7$ remains un-decoded, so no additional attempts are made. In this case the final user list is:

$\{SINR_1, SINR_5, SINR_2, SINR_4, SINR_6, SINR_3, SINR_7\}$.

As is evident here, the decode order list is determined based on the order in which user signals are successfully decoded. It could take one or more attempts to determine this order.

FIG. 3 is a flow chart illustrating the steps of an exemplary embodiment of a process of determining a number of subsequent frames in which the ordered list is utilized. Briefly, the process determines a time period during which the SINRs of the received user signals are likely to remain stable, and then calculates the number of frames by dividing the determined time period by the frame time length.

At step 41, speed estimates $(V_1, V_2, V_3, \ldots V_n)$ are determined for all the in-cell users. This may be done using Doppler measurements of the carrier frequency as transmitted by each user. The speed estimate of each User i is then calculated using:

$$V_i = f_d \cdot C / f_c$$

where $f_d$ is the measured Doppler shift; C is the speed of light constant; and $f_c$ is the carrier frequency.

At step 42, a maximum speed V_max is determined among the n users. At step 43, a minimum coherence time $T_c$ is determined based on the maximum speed V_max using:

$$T_c = 1/f_d$$

where $f_d$ is the measured Doppler shift of the user having V_max. At step 44, the interference canceller determines a number of frames K corresponding to $T_c$ using:

$$K = [T_c/(\text{frame time length})]$$

where K is an integer value.

For CDMA, the frame time length is 20 ms. For other systems, the frame time length may be different. As an example using CDMA, if $T_c$=150 ms, then K=the integer value of 150/20=7 frames.

Figure 4:
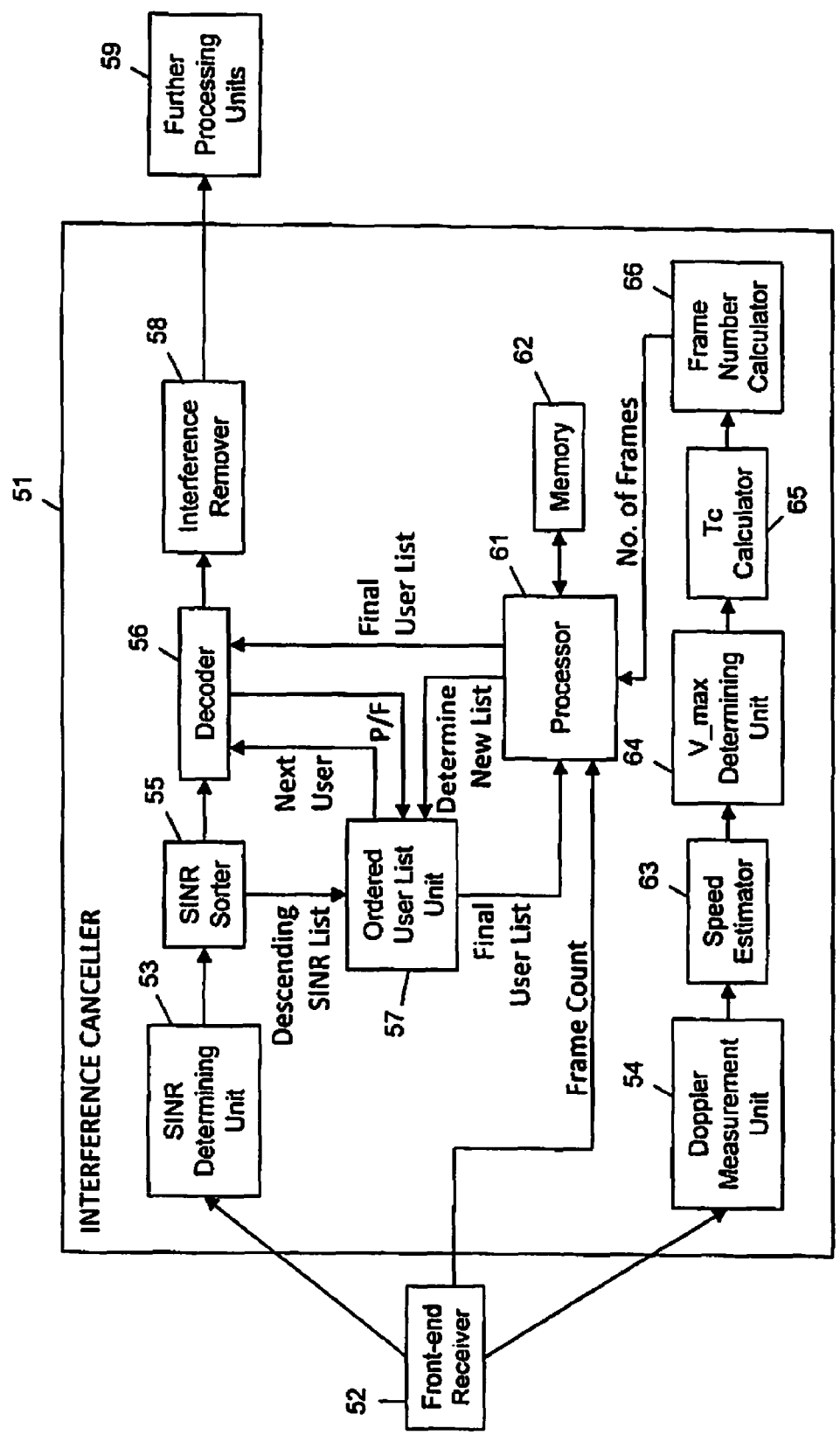
FIG. 4 is a simplified block diagram of an exemplary embodiment of an interference cancellation unit of the present invention.

FIG. 4 is a simplified block diagram of an exemplary embodiment of an interference cancellation unit 51 of the present invention. A front-end receiver 52 such as, for example, a RAKE receiver receives the radio signals from the multiple users and provides signal information to an SINR determining unit 53 and a Doppler measurement unit 54. The SINR determining unit provides SINR values to an SINR sorter 55, which forwards the received signal information to a decoder 56 and provides a descending list of SINR values to an ordered user list unit 57. The ordered user list unit performs the process shown in FIG. 2 to determine the order in which the user signals are decoded. Whenever a user signal is successfully decoded, the decoder forwards the decoded signal to an interference remover 58, which removes the interference contribution of the decoded user signal. When the interference from all of the decoded user signals has been removed from the radio signal, the signal is sent to further processing units 59 to recover the transport block.

The decoder 56 also provides a pass/fail (PIF) indication to the ordered user list unit 57 for use in determining the final user list, which is sent to a processor 61. As previously noted, the operation of the interference canceller may be controlled by a processor executing computer program instructions stored on a memory 62. Alternatively, the interference canceller may be implemented in hardware, firmware, or a combination of software, hardware, and firmware.

Meanwhile, the Doppler measurement unit 54 sends Doppler measurements to a speed estimator 63, which estimates the speeds of the multiple users. The speed estimates are sent to a V_max determining unit 64 for determining the fastest speed among the users. The determined V_max is then utilized by a $T_c$ calculator to determine the minimum coherence time $T_c$. A frame number calculator then utilizes the minimum coherence time $T_c$ to determine the number of subsequent frames to which to apply the final user list. The frame number calculator sends the determined number of subsequent frames to the processor 61, and the processor causes the decoder 56 to decode the user signals in the order of the final user list for the determined number of subsequent frames. When the frame count equals the determined number of subsequent frames, the processor causes the ordered user list unit to determine a new list.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a radio receiver node for canceling multi-user interference in a single-carrier radio communication system in which a front-end receiver receives a radio signal formatted in a sequence of frames, and each frame includes a plurality of user signals, each user signal contributing to the multi-user interference, the method comprising the steps of:
    determining for a current frame, an order in which to decode and remove the interference contributions of the plurality of user signals, wherein the user signals are listed in descending order of average signal-to-interference-plus-noise ratio (SINR) for each user signal;
    determining a number of subsequent frames in which the user signals are to be decoded in the determined order; and
    decoding and removing the interference contributions of the plurality of user signals in the determined order for the determined number of frames.

2. The method according to claim 1, further comprising the steps of:
    after decoding and removing the interference contributions of the plurality of user signals in the last of the determined number of frames, determining for a next frame, a new order in which to decode and remove the interference contributions of the plurality of user signals;
    determining a new number of subsequent frames in which the user signals are to be decoded in the new determined order; and decoding and removing the interference contributions of the plurality of user signals in the new order in the new number of frames.

3. The method according to claim 1, wherein the step of determining an order in which to decode and remove the interference contributions of the plurality of user signals includes the steps of:
attempting in a first iteration, to decode the plurality of user signals in descending order of SINR;
adding any successfully decoded user signals to an ordered list of user signals in descending order of SINR;
attempting in a second iteration, to decode in descending quality order of SINR, any of the plurality of user signals that were not successfully decoded in the first iteration;
adding any user signals successfully decoded in the second iteration to the end of the ordered list in descending order of SINR; and
adding any remaining un-decoded user signals to the end of the ordered list in descending order of SINR.

4. The method according to claim 3, further comprising, before the step of adding any remaining un-decoded user signals to the end of the ordered list, the steps of:
determining whether there is more than one failed user signal remaining, and at least one of the failed user signals has a higher SINR than a successfully decoded user signal;
if so, attempting in a third iteration, to decode in descending order of SINR, any of the plurality of user signals that were not successfully decoded in the first or second iterations; and
adding any user signals successfully decoded in the third iteration to the ordered list in descending order of SINR following the user signals successfully decoded in the first and second iterations.

5. The method according to claim 1, wherein the step of determining an order in which to decode and remove the interference contributions of the plurality of user signals includes the steps of:
attempting to decode a first user signal having the highest SINR; and
when the first user signal cannot be decoded, utilizing the list of user signals in descending order of SINR as the determined order.

6. The method according to claim 1, wherein the step of determining a number of subsequent frames in which the user signals are to be decoded in the determined order includes the steps of:
determining a time period during which the SINRs of the user signals are likely to remain stable; and
determining the number of subsequent frames by dividing the determined time period by a frame time length.

7. The method according to claim 6, wherein the step of determining a time period includes the steps of:
determining a maximum speed estimate of the users transmitting the plurality of user signals by measuring a Doppler shift of each of the plurality of user signals; and
determining a minimum coherence time based on the measured Doppler shift of the user signal having the maximum speed estimate.

8. The method according to claim 7, wherein the step of determining a minimum coherence time includes determining the minimum coherence time ($T_c$) using $T_c=1/f_d$, where $f_d$ is the measured Doppler shift of the user signal having the maximum speed estimate.

9. An apparatus in a radio receiver node for canceling multi-user interference in a single-carrier radio communication system in which a front-end receiver receives a radio signal formatted in a sequence of frames, and each frame includes a plurality of user signals, each user signal contributing to the multi-user interference, the apparatus comprising:
an ordered user list unit for determining for a current frame, an order in which to decode and remove the interference contributions of the plurality of user signals, wherein the user signals are listed in descending order of average signal-to-interference-plus-noise ratio (SINR) for each user signal;
a frame number calculator for determining a number of subsequent frames in which the user signals are to be decoded in the determined order; and
a decoder for decoding and removing the interference contributions of the plurality of user signals in the determined order for the determined number of frames.

10. The apparatus according to claim 9, further comprising:
means for detecting that the last frame in the determined number of subsequent frames has been decoded; and
means, responsive to detecting that the last frame has been decoded, for controlling the ordered user list unit, the frame number calculator, and the decoder, respectively, to:
determine for a next frame, a new order in which to decode and remove the interference contributions of the plurality of user signals;
determine a new number of subsequent frames in which the user signals are to be decoded in the new determined order; and
decode and remove the interference contributions of the plurality of user signals in the new order in the new number of frames.

11. The apparatus according to claim 9, wherein the ordered user list unit is controlled by a processor to determine the number of subsequent frames by:
attempting in a first iteration, to decode the plurality of user signals in descending order of SINR;
adding any successfully decoded user signals to an ordered list of user signals in descending order of SINR;
attempting in a second iteration, to decode in descending order of SINR, any of the plurality of user signals that were not successfully decoded in the first iteration;
adding any user signals successfully decoded in the second iteration to the end of the ordered list in descending order of SINR; and
adding any remaining un-decoded user signals to the end of the ordered list in descending order of SINR.

12. The apparatus according to claim 9, wherein the ordered user list unit is controlled by a processor to determine the number of subsequent frames by:
attempting to decode a first user signal having the highest SINR; and
when the first user signal cannot be decoded, utilizing the list of user signals in descending order of SINR as the determined order.

13. The apparatus according to claim 9, wherein the frame number calculator includes:
means for determining a time period during which the SINRs of the user signals are likely to remain stable; and
means for determining the number of subsequent frames by dividing the determined time period by a frame time length.

14. The apparatus according to claim 13, wherein the means for determining a time period includes:
a Doppler measurement unit for measuring a Doppler frequency shift of each of the plurality of user signals;

a speed estimator for utilizing the measured Doppler frequency shifts to determine a maximum speed estimate of the users transmitting the plurality of user signals; and a calculation unit for determining a minimum coherence time based on the measured Doppler shift of the user signal having the maximum speed estimate.

15. The apparatus according to claim 14, wherein the calculation unit determines the minimum coherence time ($T_c$) using $T_c=1/f_d$, where $f_d$ is the measured Doppler shift of the user signal having the maximum speed estimate.

16. A radio receiver system in a single-carrier radio communication network for receiving a radio signal comprising a plurality of user signals and for canceling multi-user interference between the plurality of received user signals, wherein the radio signal is formatted in a sequence of frames, and each frame includes the plurality of user signals, the receiver system comprising:

a front-end receiver for detecting the radio signal and outputting the plurality of user signals;

an ordered user list unit for determining for a current frame, an order in which to decode and remove the interference contributions of the plurality of user signals, wherein the user signals are listed in descending order of average signal-to-interference-plus-noise ratio (SINR) for each user signal;

a frame number calculator for determining a number of subsequent frames in which the received radio signals are to be decoded in the determined order; and a decoder for decoding and removing the interference contributions of the plurality of user signals in the determined order for the determined number of frames.

17. The receiver system according to claim 16, wherein the radio communication network is a Code Division Multiple Access (CDMA) network, and the front-end receiver is a RAKE receiver.

18. The receiver system according to claim 16, wherein the ordered user list unit includes means for building an ordered user list by first adding to the list in order of decreasing SINR, user signals that were successfully decoded in a first iteration, and then adding to the end of the list in order of decreasing SINR, user signals that were not successfully decoded in the first iteration but were successfully decoded in a second iteration, and then adding to the end of the list in order of decreasing SINR, any user signals that were not successfully decoded in the first and second iterations.

19. The receiver system according to claim 16, wherein the frame number calculator includes:

a Doppler measurement unit for measuring a Doppler frequency shift of each of the plurality of user signals;

a speed estimator for utilizing the measured Doppler frequency shifts to determine a maximum speed estimate of the users transmitting the plurality of user signals;

a calculation unit for determining a minimum coherence time based on the measured Doppler shift of the user signal having the maximum speed estimate; and means for determining the number of subsequent frames by dividing the minimum coherence time by a frame time length.

* * * * *